(12) United States Patent
Wong et al.

(10) Patent No.: US 10,321,452 B2
(45) Date of Patent: Jun. 11, 2019

(54) METHOD FOR DETERMINING RESOURCES OF PHYSICAL DOWNLINK CONTROL CHANNELS

(71) Applicants: Shin Horng Wong, Chippenham (GB); Matthew Baker, Carterbury (GB); Qi Jiang, Shanghai (CN); Zheng Liu, Shanghai (CN)

(72) Inventors: Shin Horng Wong, Chippenham (GB); Matthew Baker, Carterbury (GB); Qi Jiang, Shanghai (CN); Zheng Liu, Shanghai (CN)

(73) Assignee: Alcatel Lucent, Nozay (FR)

( * ) Notice: Subject to any disclaimer, the term of this patent is extended or adjusted under 35 U.S.C. 154(b) by 0 days.

(21) Appl. No.: 15/896,121

(22) Filed: Feb. 14, 2018

(65) Prior Publication Data

US 2018/0242290 A1    Aug. 23, 2018

Related U.S. Application Data

(63) Continuation of application No. 14/431,052, filed as application No. PCT/CN2012/082195 on Sep. 27, 2012, now Pat. No. 9,992,769.

(51) Int. Cl.
- *H04W 72/04* (2009.01)
- *H04L 5/00* (2006.01)
- *H04J 11/00* (2006.01)

(52) U.S. Cl.
CPC ....... *H04W 72/042* (2013.01); *H04J 11/0086* (2013.01); *H04L 5/001* (2013.01); *H04L 5/0007* (2013.01); *H04L 5/0053* (2013.01)

(58) Field of Classification Search
CPC ... H04W 72/042; H04W 80/04; H04W 72/04; H04W 88/06; H04L 5/001; H04L 5/0007; H04L 5/0053
See application file for complete search history.

(56) References Cited

U.S. PATENT DOCUMENTS

| 7,738,436 B2 | 6/2010 | Taniguchi |
| 9,160,484 B2 | 10/2015 | Malladi et al. |

(Continued)

FOREIGN PATENT DOCUMENTS

| CN | 101345982 A | 1/2009 |
| JP | 2009-232463 | 10/2009 |

(Continued)

OTHER PUBLICATIONS

International Search Report for PCT/CN2012/082195 dated Jun. 20, 2013.

(Continued)

*Primary Examiner* — Chi Ho A Lee
(74) *Attorney, Agent, or Firm* — Fay Sharpe LLP

(57) ABSTRACT

A method for determining resources to be decoded by the UE to retrieve physical downlink control channels. A method is in a UE or an eNB and comprises the following steps of: i. determining a start position of a unit of resources in one physical resource block pair; ii. determining a gap between two of the units; and iii. determining a set of units, in a given plurality of physical resource block pairs, according to said start position and said gap, as the resources to be decoded. In this way, the eNB and the UE can locate all the resources for the EPDCCH, namely the search space is determined. This aspect allows a balance between the number of blind decoding and eNB scheduling flexibility in the EPDCCH search space.

13 Claims, 8 Drawing Sheets

(56) References Cited

U.S. PATENT DOCUMENTS

| | | |
|---|---|---|
| 2009/0238091 A1 | 9/2009 | Kim et al. |
| 2012/0218969 A1 | 8/2012 | Tan |
| 2012/0236813 A1 | 9/2012 | Tan |
| 2012/0269143 A1 | 10/2012 | Bertrand |
| 2013/0010685 A1 | 1/2013 | Kim |
| 2013/0034062 A1 | 2/2013 | Seo |
| 2013/0064193 A1 | 3/2013 | Moon |
| 2013/0230017 A1 | 9/2013 | Papasakellariou |
| 2013/0301434 A1 | 11/2013 | Krishnamurthy |
| 2013/0301542 A1 | 11/2013 | Krishnamurthy |
| 2013/0315159 A1 | 11/2013 | Xia |
| 2014/0078980 A1 | 3/2014 | Frenne |
| 2015/0085779 A1 | 3/2015 | Seo |
| 2015/0195817 A1 | 7/2015 | Sathananthan |
| 2015/0195821 A1 | 7/2015 | Li |
| 2015/0271788 A1 | 9/2015 | Kim |
| 2015/0341953 A1 | 11/2015 | Xia |

FOREIGN PATENT DOCUMENTS

| | | |
|---|---|---|
| JP | 2010-541367 | 12/2010 |
| JP | 2014-532315 | 12/2014 |
| RU | 2391799 C2 | 6/2010 |
| RU | 2010121842 A | 12/2011 |
| WO | WO 2009/033280 A1 | 3/2009 |
| WO | WO 2011/143586 A1 | 11/2011 |
| WO | WO 2012/109542 | 8/2012 |
| WO | WO 2014/045608 A1 | 3/2014 |

OTHER PUBLICATIONS

Huawei, et al., "Search Space design for ePDCCH", R1-123120, 3GPP TSG RAN WG1 Meeting #70, Qingdao, China, Aug. 13-17, 2012.

Motorola Mobility, "Configuration of EPDCCH", R1-123788, 3GPP TSG RAN WG1 #70, Aug. 13-18, 2012, QingDao, P.R. China.

"3$^{rd}$ Generation Partnership Project; Technical Specification Group Radio Access Network; Evolved Universal Terrestrial Radio Access (E-UTRA); Physical layer procedures", (Release 11), 3GPP TS 36.213 v 11.0.0 (Sep. 2012), pp. 1-143.

Intel, et al., "WF on ePDCCH Search Space", R1-123944, TSG-RAN WG1 Meeting #70, Qingdao, China, Aug. 13-17, 2012.

Mediatek Inc., "eCCE Aggregation Level and Complexity Analysis", R1-123339, 3GPP TSG-RAN, WG1 #70, Qingdao, China, Aug. 13-17, 2012.

Samsung, "UE-specific search space", R1-081212, 3GPP TSG-RAN WG1 Meeting #52bis, Shenzhen, China, Mar. 31-Apr. 4, 2008.

METHOD FOR DETERMINING RESOURCES OF PHYSICAL DOWNLINK CONTROL CHANNELS

This application is a continuation of U.S. patent application Ser. No. 14/431,052S, filed on Mar. 25, 2015, which claims the benefit of priority from International Application No. PCT/CN2012/082195, filed Sep. 27, 2012, which is hereby incorporated herein by reference in its entirety.

TECHNICAL FIELD

The invention relates to radio communications, particularly relates to resources carrying physical downlink control channels.

BACKGROUND OF THE INVENTION

Currently in 3GPP, a Work Item to enhance the Physical Downlink Control Channel (PDCCH) for LTE is being discussed. In this Work Item, a new control channel, the Enhanced PDCCH (EPDCCH), is introduced. EPDCCH offers higher capacity for control channels and efficient use of resource via spatial reuse (MU-MIMO) and beamforming. EPDCCH shares the same resource space as that used by PDSCH (Physical Downlink Shared Channel).

An EPDCCH can be transmitted in a localized or distributed manner. Localized transmission schedules the resources for EPDCCH based on CSI (Channel State Information) reported by the UE on the resource space. The eNB selects the PRB (Physical Resource Block) pair with the desired radio condition to transmit the EPDCCH for the UE. Distributed transmission is usually used if no reliable CSI is available at the eNB. Here the EPDCCH is spread over several PRB pairs, so as to take advantage of frequency diversity. FIG. 1 shows an example of a localized transmission and a distributed transmission, wherein the smallest block stands for an Enhanced Resource Element Group (EREG) which will be described in the following. The term UE denotes User Equipment, and the term eNB denotes evolved NodeB, where a NodeB is a cellular telecommunications base station.

FIG. 2 shows the components of an EPDCCH. The building block of an EPDCCH is the Enhanced Resource Element Group (EREG), where an EREG consists of 9 Resource Elements (RE) that are distributed in a PRB pair. In localised transmission an EPDCCH is formed by at least one Enhanced Control Channel Element (ECCE) where an ECCE consists of several EREGs in the same PRB pairs. The total number of EREG per PRB pair is 16. The number of EREG in an ECCE is 4 or 8 (i.e. 4 or 2 ECCEs per PRB pair) depending on the amount of available RE in a PRB pair. In distributed transmission the EPDCCH consists of EREG from different PRB pairs. In the illustration of FIG. 2, the ECCE comprises 4 EREG in the same row, and the EPDCCH comprises 2 ECCE.

The number of ECCE (in localised transmission) and the number of EREG (in distributed transmission) in an EPDCCH is dependent upon the Aggregation Level (AL) of the Downlink Control Information (DCI) message carried by the EPDCCH. The higher the AL is, the more ECCE (or EREG) is required in the EPDCCH. The amount of ECCE is equals to the AL, that is if the AL is 2 then 2 ECCEs (or the equivalent number of EREGs) are required to form the EPDCCH. The AL for localised transmission can be 1, 2, 4, 8 and 16 whilst the AL for distributed transmission can be 2, 4, 8, 16 and 32.

The AL and the ECCE/EREG containing the EPDCCH for a UE is not signalled to the UE. Instead, each UE is configured with a search space which consists of possible ECCE/EREG and AL combination candidates for an EPDCCH. The UE performs blind decoding on all the possible candidates to search for the one that may contain an EPDCCH intended for it. The search space consists of K EPDCCH sets where each set has NPRB PRB pairs that can contain EPDCCH. The K EPDCCH sets consist of KL sets for localised transmission and KD sets for distributed transmission.

Blind decoding consumes UE processing power and increases UE complexity. Therefore the number of blind decodings is not expected to exceed 32. However, the possible number of candidates (i.e. blind decodings) in a search space can be very large given the possible combinations of AL and parameters NPRB and K of the search space. Consequently there is a need to limit this number of candidates. However, a reduction in the number of candidates reduces the scheduling flexibility of the eNB.

SUMMARY OF THE INVENTION

The technical problem to solve is to define a search space rule to balance the number of candidates that need to be decoded by the UE and the scheduling flexibility of the eNB.

The basic idea of the solution is to determine the candidate by defining the following rules:

1) A start index to the unit of EPDCCH, namely index of ECCE for localized and distributed transmission, and for distributed transmission define also an index of EREG in the ECCE; and 2) A gap between two units of EPDCCH.

According to one aspect of the invention, it is proposed a method, in a UE or an eNB, of determining resources to be decoded by the UE to retrieve physical downlink control channels, comprising the following steps of:

i. determining a start position of a unit of resources in one physical resource block pair;

ii. determining a gap between two of the units; and iii. determining a set of units, in a given plurality of physical resource block pairs, according to said start position and said gap, as the resources to be decoded.

In this way, the eNB and the UE can locate the exact resources for the EPDCCH within a given plurality of physical resource block pairs, by determining the start position and the gap. This aspect allows a balance between the number of blind decoding and eNB scheduling flexibility in the EPDCCH search space.

In a preferred embodiment, wherein said unit is a control channel element within a physical resource block, and said step i determines the start position of a control channel element in one physical resource block pair according to:

UE specific information;

the total number of control channel elements that is required in the physical downlink control channel; and the number of control channel elements in one physical resource block pair.

This embodiment is applicable for the localized transmission mode. And since the start position of a control channel element is relevant to the UE specific information, different UE would have different start position and this gives the eNB the flexibility in scheduling the control channel element within a PRB but not cause excessive amount of blind decodings for the UE.

In a further improvement of the above embodiment, the step i uses the following equation:

$$I_{ECCE} = \max[ID_{C\text{-}RNTI} \bmod(N_{ECCE} - (AL-1)), 0]$$

wherein, $I_{ECCE}$ stands for the index of the start control channel element in one physical resource block pair, $ID_{C\text{-}RNTI}$ stands for a UE-specific ID, $N_{ECCE}$ stands for the number of control channel elements in one physical resource block pair, and AL stands for the aggregation level that is relevant with the total number of control channel elements that is required in the physical downlink control channel.

This improvement provides a more specific implementation of how to determine the start position of the control channel element.

In a preferred embodiment, wherein the unit of the resources is a resource element group within a control channel element in a physical resource block pair, and said step i comprises the following steps:

a. determining the start position of a control channel element, within which the resource element group is located, in one physical resource block pair according to:
   UE specific information;
   the total number of control channel elements that is required;
   the number of resource element groups in one control channel element; and
   the number of control channel elements in one physical resource block pair;

b. determining the start position of the resource element group in the control channel element according to:
   UE specific information;
   the total number of control channel elements that is required; and
   the number of resource element groups in one control channel element.

This embodiment is applicable for the distributed transmission mode. And since the start position of a resource element group within a control channel element and the start position of the control channel element in a PRB pair are relevant to the UE specific information, different UE would have different start positions and this gives the eNB the flexibility in scheduling the resource element group and the control channel element within a PRB but not causes excessive amount of blind decodings for the UE.

In an improvement of the above embodiment, the step a uses the following equation:

$$I_{ECCE} = \max\left[ID_{C\text{-}RNTI} \bmod\left(N_{ECCE} - \left(\left\lfloor \frac{AL}{N_{EREG}} \right\rfloor - 1\right)\right), 0\right]$$

wherein, $I_{ECCE}$ stands for the index of the start control channel element in one physical resource block pair, $ID_{C\text{-}RNTI}$ stands for a UE-specific ID, $N_{ECCE}$ stands for the number of control channel elements in one physical resource block pair, $N_{EREG}$ stands for the number of resource element groups within one control channel elements, and AL stands for the aggregation level that is relevant with the total number of control channel elements that is required in the physical downlink control channel.

In another improvement of the above embodiment, the step b uses the following equation:

$$I_{EREG} = \max[ID_{C\text{-}RNTI} \bmod(N_{EREG} - (AL-1)), 0]$$

wherein, $I_{EREG}$ stands for the index of the start resource element group within one control channel elements, $ID_{C\text{-}RNTI}$ stands for a UE-specific ID, $N_{EREG}$ stands for the number of resource element groups within one control channel elements, and AL stands for the aggregation level that is relevant with the total number of control channel elements that is required in the physical downlink control channel.

These improvements provide more specific implementations of how to determine the start positions.

In a preferred embodiment, wherein the step i determines the start position of a unit of the resources in one physical resource block pair further according to at least one of:
   the index of the sub-frame for the physical downlink control channel;
   the physical resource block pairs for the physical downlink control channel.

This embodiment allows further randomization of the resources used by the UE to avoid collision of the same resource being used by multiple UEs.

In a preferred embodiment, said unit is a control channel element within a physical resource block pair, and said step ii comprises:
   determines the gap between two of the control channel elements; or
   determines the control channel elements within the same physical resource block pair as being contiguous.

This embodiment is applicable for the localized transmission mode.

In a preferred embodiment, the unit of the resources is a resource element group within a control channel element in a physical resource block pair, and said step ii comprises:
   determines the resource element groups within the same control channel element as being contiguous;
   determines the gap between corresponding resource element groups within different physical resource block pairs according to:
   the number of control channel elements in one physical resource block pair;
   the total number of physical resource block pairs available for the physical downlink control channel; and
   the number of physical resource block pairs into which the physical downlink control channel is to be spread.

This embodiment is applicable for the distributed transmission mode. Resource element groups within the same control channel element are contiguous without any gap, therefore the complexity is low. And the gap between corresponding resource element groups within different physical resource block pairs can spread the resource element group evenly in the logical space of the control channel element and the resource element group, and improves the diversity gain.

In an improved embodiment, the step ii uses the following equation to determine the gap between corresponding resource element groups within different physical resource block pairs:

$$G_{EREG} = \left\lfloor \frac{(N_{ECCE} \times N_{PRB})}{N_{DIV}} \right\rfloor$$

wherein, $G_{EREG}$ is the gap in a unit of control channel element, $N_{ECCE}$ stands for the number of control channel elements in one physical resource block pair, $N_{PRB}$ stands for the total number of physical resource block pairs available for the physical downlink control channel, and $N_{DIV}$ stands for the number of physical resource block pairs into which the physical downlink control channel is to be spread.

This improvement provides a more specific implementation of how to determine the gap.

In a preferred embodiment, the method is in a UE for retrieving the physical downlink control channel, and the method further comprises the following steps:

determining one or more candidates in said plurality of physical resource block pairs, based on the determined set;

for a respective candidate, decoding the signal transmitted on the set of units of resources for that candidate, for retrieving the physical downlink control channel from that candidate.

This embodiment provides the implementation of the invention in a UE for conducting the search for the EPDCCH.

In another preferred embodiment, the method in an eNB for transmitting the physical downlink control channel, the method further comprises the following steps:

determining one or more candidates in said plurality of physical resource block pairs, based on the determined set;

selecting one from the one or more determined candidates, and transmitting the encoded physical downlink control channel in the selected candidate.

This embodiment provides the implementation of the invention in an eNB for transmitting the EPDCCH in a proper resource that can be detected by the UE.

Since the search space of the EPDCCH is relevant with the aggregation level, if a UE can be aware of a possible range of aggregation levels, the UE can reduce its search space. Another basic idea of the invention is that the network implicitly signals the range of the AL in an EPDCCH set to the UE. The solution is forming a relation between the maximum and/or minimum aggregation level in an EPDCCH set and the configuration of the PRB pairs.

In another aspect of the invention, it is provided a method, in UE, of determining aggregation levels of downlink control information, comprising the steps of:

x. determining information regarding the physical resource block pairs for the physical downlink control channel;

y. determining a maximum value of the aggregation level and/or a minimum value of the aggregation level, according to said information;

z. determining available aggregation levels, according to the maximum value and an upper threshold of the aggregation level, and/or according to the minimum value of the aggregation level.

In this aspect, the UE can be implicitly notified of the possible range of aggregation levels, thus it needs only decode the candidate resource for EPDCCH of the aggregation level within that range, thereby the search space is reduced.

In a preferred embodiment, said step x determines the number of contiguous control channel elements in the contiguous physical resource block pairs, and said step y determines the maximum value as said number of the contiguous control channel elements; and/or, said step x determines the number of the contiguous physical resource block pairs, and said step y determines the minimum value as being proportional with said number of the contiguous physical resource block pairs.

This embodiment is applicable for the localized transmission mode.

In another preferred embodiment, said step x determines the number of control channel elements in the physical resource block pairs, and said step y determines the maximum value as said number of the control channel elements; and/or said step y determines the minimum value as being proportional with said number of the physical resource block pairs.

This embodiment is applicable for the distributed transmission mode.

Additional optional aspects and features are disclosed, which may be arranged in any functionally appropriate manner, either alone or in any functionally viable combination, consistent with the teachings of the disclosure. Other aspects and advantages will become apparent upon consideration of the following detailed description.

BRIEF DESCRIPTION OF THE DRAWINGS

Features, aspects and advantages of the present invention will become obvious by reading the following description of non-limiting embodiments with the aid of appended drawings. Wherein, same or similar reference numerals refer to the same or similar steps or means.

DETAILED DESCRIPTION OF THE EMBODIMENTS

Figure 1:
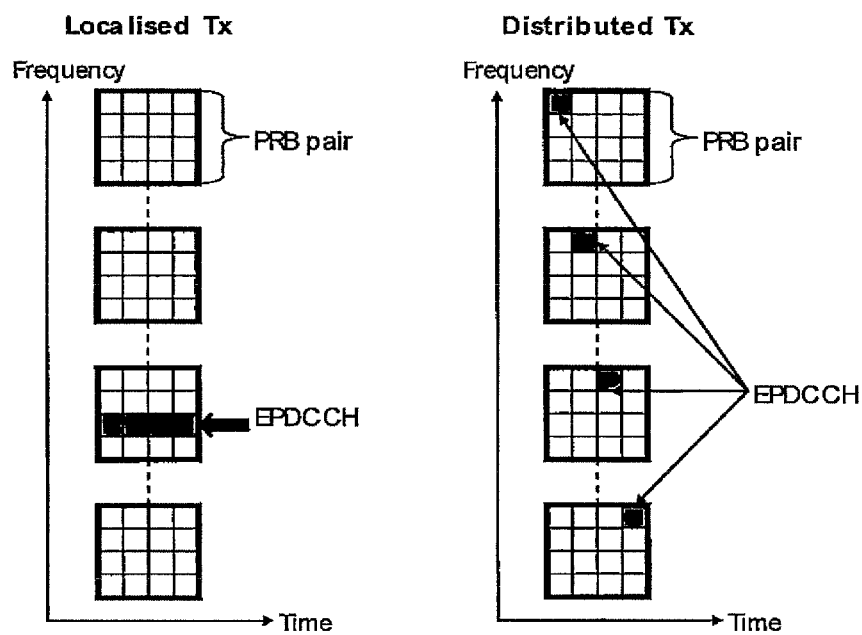
FIG. 1 shows an example of a localized transmission and a distributed transmission of EPDCCH.
Figure 2:
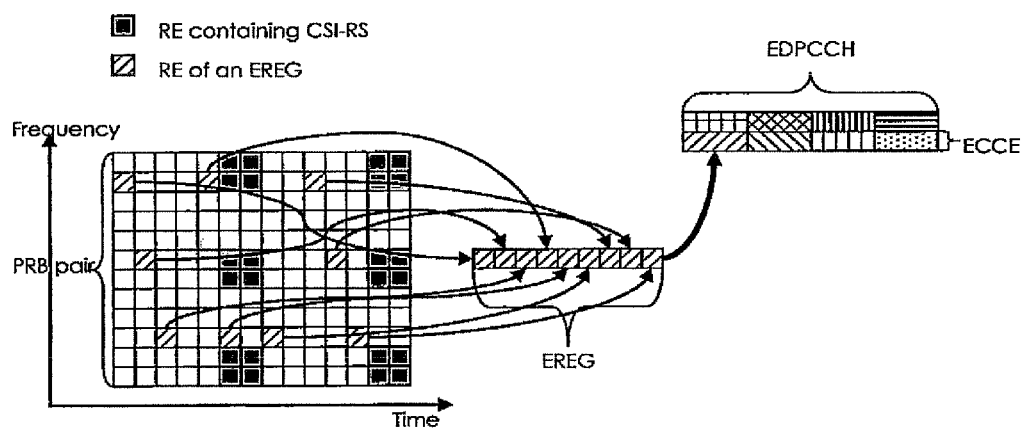
FIG. 2 shows the components of an EPDCCH, which are the ECCE and the EREG comprised by the ECCE.

It is proposed a method, in a UE or an eNB, of determining resources to be decoded by the UE to retrieve physical downlink control channels, comprising the following steps of:

i. determining a start position of a unit of resources in one physical resource block pair;

ii. determining a gap between two of the units; and iii. determining a set of units, in a given plurality of physical resource block pairs, according to said start position and said gap, as the resources to be decoded.

In this disclosure, the following variables and notations are defined:

$N_{PRB}$ is the number of PRB pairs in an EPDCCH set $AL_{MAX-L}$ is the maximum allowed aggregation level for localized transmission $AL_{MAX-D}$ is the maximum allowed aggregation level for distributed transmission $N_{ECCE}$ is the number of ECCE in a PRB pair $N_{EREG}$ is the number of EREG in an ECCE $N_{DIV}$ is the diversity level in an EPDCCH set for distributed transmission. The diversity level is equals to the number of PRB pair an EPDCCH is spread to.

It should be noted that the notations can be varied in the practical implementations and technical standards.

As to the start position of a unit of resources in one physical resource block pair, the disclosure discusses it respectively for localized transmission and distributed transmission.

The step i defines an index to the start of the EPDCCH unit (e.g. ECCE or EREG) in a PRB. This index is a function of the UE-specific information such as UE ID, AL, and NECCE (for localized) or NECCE and NEREG (for distributed). This reduces the number of possible candidates since each UE is given a specific location in an EPDCCH set to search for the candidates for a given AL.

For localized transmission, the unit is an ECCE within a PRB pair. The index IECCE points to the ECCE, of an EPDCCH candidate, within a PRB pair. Different UE would have different IECCE and this allows the eNB the flexibility in scheduling the ECCE within a PRB but not cause excessive amount of blind decodings for the UE.

$$I_{ECCE} = \max[ID_{C\text{-}RNTI} \bmod (N_{ECCE} - (AL-1)), 0] \quad (1)$$

For distributed transmission, the unit is an EREG within an ECCE in a PRB pair. The UE and the eNB can determine the ECCE index of that ECCE according to the UE ID, AL and $N_{ECCE}$ and $N_{EREG}$. One specific implementation is using equation 2:

$$I_{ECCE} = \max\left[ID_{C\text{-}RNTI} \bmod \left(N_{ECCE} - \left(\left\lfloor \frac{AL}{N_{EREG}} \right\rfloor - 1\right)\right), 0\right] \quad (2)$$

The UE and the eNB can also determine the index $I_{EREG}$ of the EREG in that ECCE according to the UE ID, AL and $N_{EREG}$. One specific implementation is using the following equation 3:

$$I_{EREG} = \max[ID_{C\text{-}RNTI} \bmod (N_{EREG} - (AL-1)), 0] \quad (3)$$

It should be noted that the equations 1, 2 and 3 can be modified. As long as the IECCE for localized transmission is relevant with the UE-specific information, the total number of control channel elements that is required in the physical downlink control channel, and the number of control channel elements in one physical resource block pair, this IECCE falls into the scope of the invention, and so do the IECCE and the IEREG for distributed transmission.

In a further preferred embodiment, the indexes IECCE for localized transmission, and IECCE and IEREG for distributed transmission are also a function of the sub-frame and PRB pair. This allows randomization of the resources used by the UE to avoid collision of the same resource being used by multiple UEs. For example, the indexes IECCE for localized transmission can use the following equation 1'

$$I_{ECCE} = \max[(ID_{C\text{-}RNTI} + \#\text{subframe} + \#\text{PRB}) \bmod (N_{ECCE} - (AL-1)), 0] \quad (1')$$

Wherein, the notation #subframe stands for the index number of the present subframe, and #PRB stands for the index of the physical resource block in which the PDCCH is corresponding to.

The step ii defines a gap between two building blocks of EPDCCH, and the disclosure discusses it respectively for localized transmission and distributed transmission.

Figure 3:
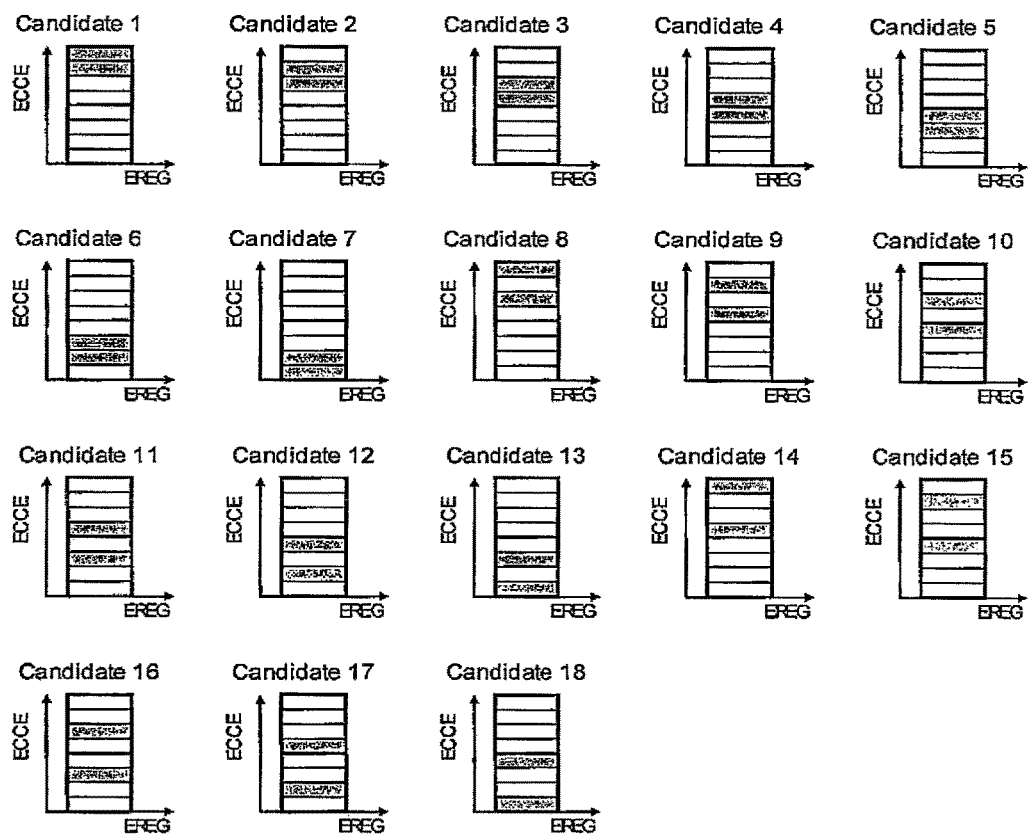
FIG. 3 shows possible candidates in two contiguous PRB for AL=2.

For localized transmission, as an example, consider two contiguous PRB pair as in FIG. 3, and the AL=2, namely with two ECCEs. The possible number of candidates is 18.

Figure 6:
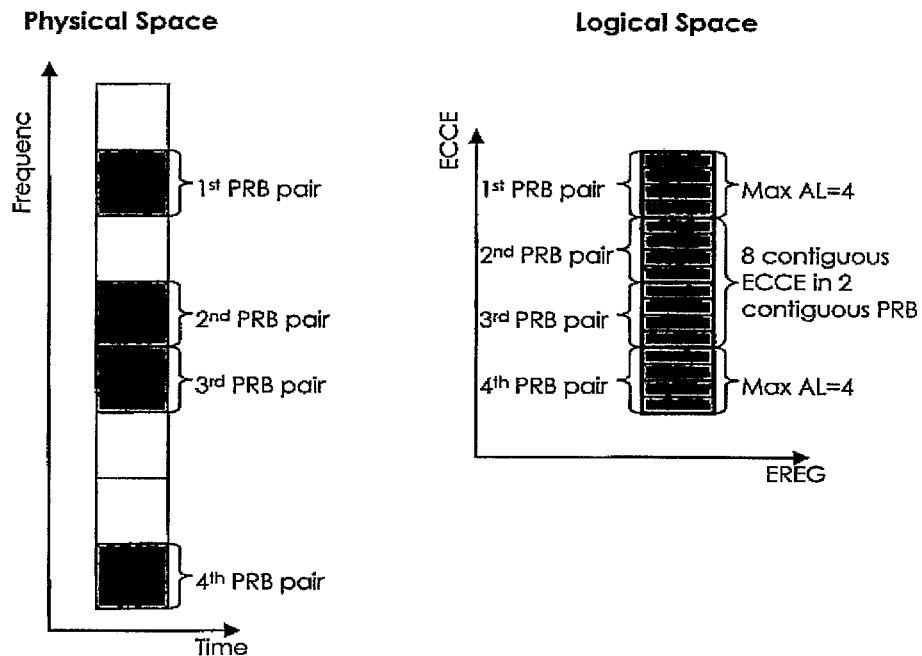
FIG. 6 shows AL in a localized EPDCCH set according to an embodiment of the invention.

The gap for localized transmission, GECCE is the number of contiguous ECCE (in the logical sense) between two ECCEs of one candidate. The gap GECCE can also be different for different UEs. As shown in FIG. 6, the gap can be 1 (two ECCE are continuous), 2, and 3.

For localized transmission for AL≤NECCE, preferably, the ECCE shall not span another (adjacent) PRB pair. Since a PRB pair containing EPDCCH cannot be used for PDSCH, an EPDCCH occupying two PRB pairs would reduce the amount of PRB for PDSCH transmission. If we include EPDCCH occupying two PRB pairs, candidates 4, 10, 11, 15, 16 and 17 are obtained.

In a further preferred embodiment, the ECCE within the same PRB pair as being contiguous, as shown in candidates 1, 2, 3, 5, 6 and 7.

Figure 4:
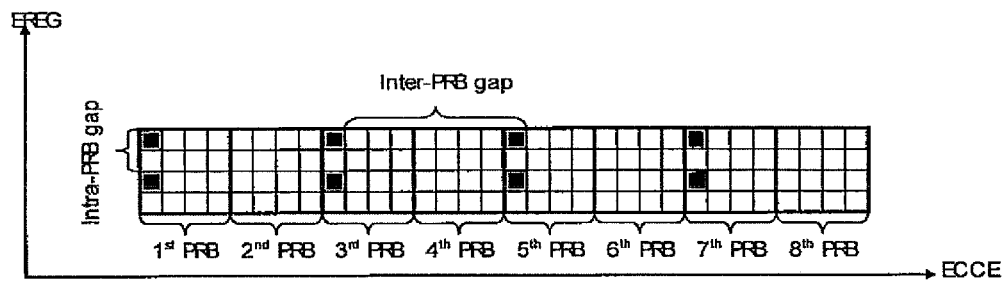
FIG. 4 shows Intra-PRB and inter-PRB gaps according to an embodiment of the invention.

For distributed transmission, there can be two possible gaps namely gap between EREG within a PRB pair (intra-PRB gap) and a gap between corresponding EREG within different PRB pair (inter-PRB gap). FIG. 4 illustrate these different gaps.

Figure 5:
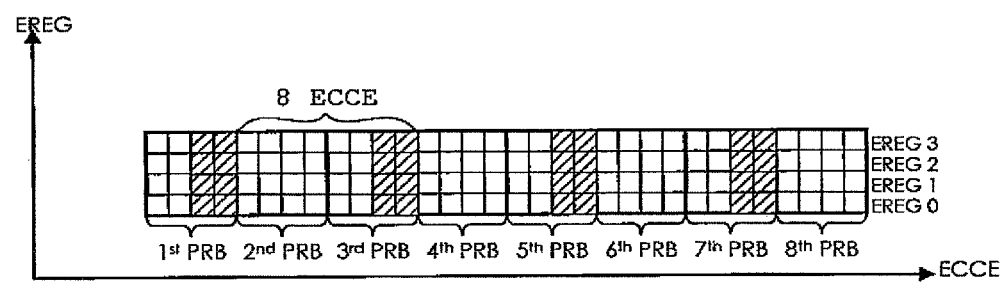
FIG. 5 shows EREG position within multiple ECCEs in the same PRB-pair according to an embodiment of the invention.

To reduce complexity, in a preferred embodiment, an intra-PRB gap is not introduced since this does not offer diversity advantage. Hence, EREGs of a PRB pair (at least within the same ECCE), are continuous. In an embodiment the same starting nth EREG within an ECCE is always used if multiple ECCEs are used within a PRB pair. As an example FIG. 5 shows the 1st to 4th EREG (indexed as 0 to 3) on two contiguous ECCEs. Note that: In FIG. 5, the EREG starting positions are also the same in all PRB pair. This does not preclude that the EREG can be different in different PRB pairs.

The nth EREG of the mth ECCE in a PRB pair would have a gap of GEREG ECCEs with a corresponding nth EREG of the mth ECCE in another PRB pair, and this gap is applicable to all n and m. An example is shown in FIG. 5 where, for example, the 4th EREG of the 4th ECCE of PRB pair 1 has a gap GEREG of 8 ECCEs with the corresponding the 4th EREG of the 4th ECCE of PRB pair 3. The gap GEREG is a function of NECCE, NDIV and NPRB. An example function is as shown in Equation 4, which spreads the EREGs evenly in the logical space of EREG & ECCE. Note that in the physical frequency & time space, the PRB-pair may not be evenly spaced.

$$G_{EREG} = \left\lfloor \frac{(N_{ECCE} \times N_{PRB})}{N_{DIV}} \right\rfloor \quad (4)$$

The above parameters NPRB, NECCE, NEREG and NDIV can be notified to the UE by the eNB. And the aggregation level is normally either of 1, 2, 4, 8, 16 for localized transmission and 1, 2, 4, 8, 16, 32 for distributed transmission. In one case, the eNB can notify the UE of the aggregation level that is actually used. In another case, the UE searches for all candidate of each of the all possible AL.

The disclosure further proposes forming a relationship between the AL on one hand, and NPRB and also the location of the PRB pairs in the frequency & time space on the other hand, and allowing the network to implicitly signal the available AL in an EPDCCH set.

The disclosure further provides a method, in UE, of determining aggregation levels of downlink control information, comprising the steps of:

x. determining information regarding the physical resource block pairs for the physical downlink control channel;

y. determining a maximum value of the aggregation level and/or a minimum value of the aggregation level, according to said information;

z. determining available aggregation levels, according to the maximum value and an upper threshold of the aggregation level, and/or according to the minimum value of the aggregation level.

A rule for localised transmission would be that the maximum AL in an EPDCCH set is equals to the number of contiguous ECCEs found in a series of contiguous PRB pairs. Let the number of contiguous ECCEs be $N_{C-ECCE}$, then the maximum $AL=N_{C-ECCE}$. However if $N_{C-ECCE}>AL_{MAX-L}$, then maximum allowed $AL=AL_{MAX-L}$. FIG. 6 shows an example of this aspect. Here, an EPDCCH set has 4 PRB pairs, $N_{PRB}=4$. The $1^{st}$ and $4^{th}$ PRB are isolated, i.e., without any adjacent PRB pairs. The $2^{nd}$ and $3^{rd}$ PRB pairs are adjacent to each other in the physical space. For the $2^{nd}$ and $3^{rd}$ PRB pairs, the number of ECCEs in these two PRB pairs is 8, i.e. $N_{C-ECCE}=8$. For the $1^{st}$ and 4th PRB pair, the number of ECCE in each of these isolated PRB pair is 4, i.e. $N_{C-ECCE}=4$. Hence, the maximum AL for the $1^{st}$ and $4^{th}$ PRB pairs is 4 whilst that for $2^{nd}$ and $3^{rd}$ PRB pair (combined) is 8. In this case, the UE can determine the available aggregation levels for the first and fourth PRB pairs as 1, 2, or 4, while for the second and third PRB pairs as 1, 2, 4, or 8. This reduces the size of possible search spaces, otherwise the AL would be 1, 2, 4, 8, or 16 for either case and thus the candidates for all AL needs to be decoded.

In another embodiment for localised transmission, a minimum AL is also imposed depending upon the number of contiguous PRB pair in the physical space found in an EPDCCH set. An example rule is the minimum AL is equals to $N_{ECCE}$ (i.e. number of ECCE in a PRB pair) when the number of contiguous PRB pair is more than 1. Using the same example in FIG. 6, the 2nd and 3rd PRB which are contiguous in the physical space would have a minimum AL=4 since the number of ECCE per PRB ($N_{ECCE}$) pair is 4. And in this case, the search space for AL=1 or AL=2 can be skipped thus the complexity can be reduced.

A similar rule can be used for distributed EPDCCH where the maximum AL of a distributed EPDCCH set is equals to the number of ECCE in that set. If the number of ECCE is greater than ALMAX-D, then maximum AL=ALMAX-D.

In another embodiment for distributed transmission, a minimum AL is also implicitly signalled by the number of ECCE in the EPDCCH set, namely depending upon the number of ECCE. For example, the minimum AL is half or the number of ECCE.

The eNB can notify the UE of the ALMAX-L and ALMAX-D via signalling, such as via RRC.

The above description elucidates the embodiments of the invention. The following part will elucidate more detailed implementation of the invention.

Example 1

This example is for distributed transmission. A distributed EPDCCH set has $N_{PRB}=8$. Let the UE C-RNTI=23. The number of EREG per ECCE, $N_{EREG}=4$. The $I_{ECCE}$ and $I_{EREG}$ for this UE for each AL using Equation 2 and 3 are listed in Table 1.

TABLE 1

| AL | $I_{ECCE}$ | $I_{EREG}$ |
|----|------------|------------|
| 1  | 3          | 3          |
| 2  | 3          | 2          |
| 4  | 3          | 0          |
| 8  | 2          | 0          |
| 16 | 0          | 0          |

Using Equation 4, the ECCE gap between 2 EREGs of the same diversity is GEREG=8.

Figure 7:
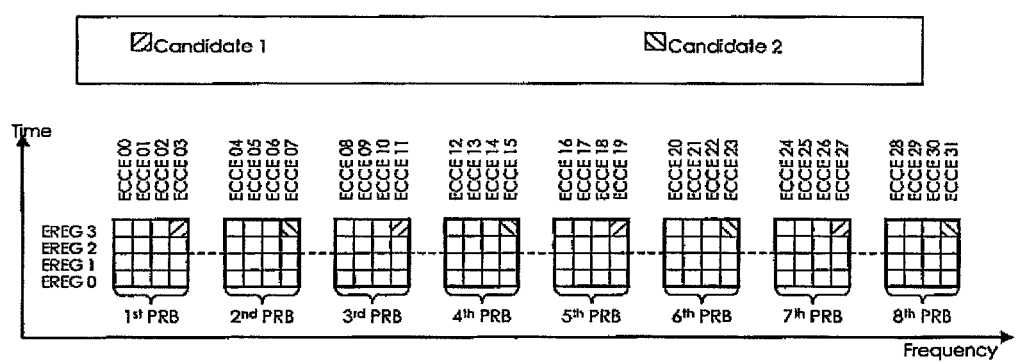
FIG. 7-11 respectively show possible candidates for each AL in a distributed transmission according to an embodiment of the invention.
Figure 8:
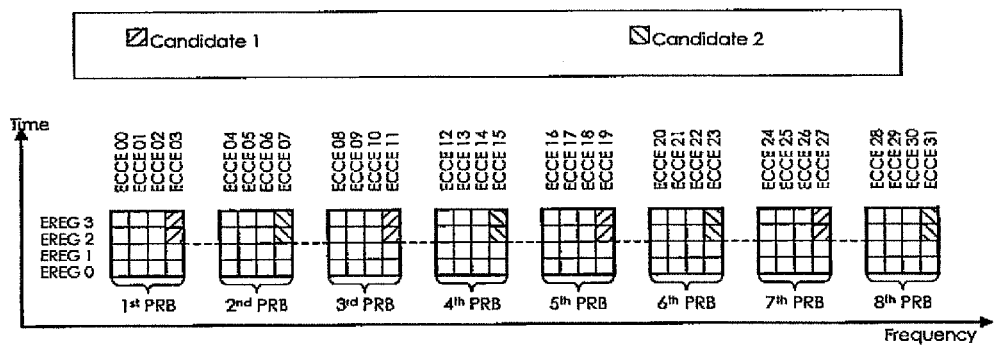
Figure 9:
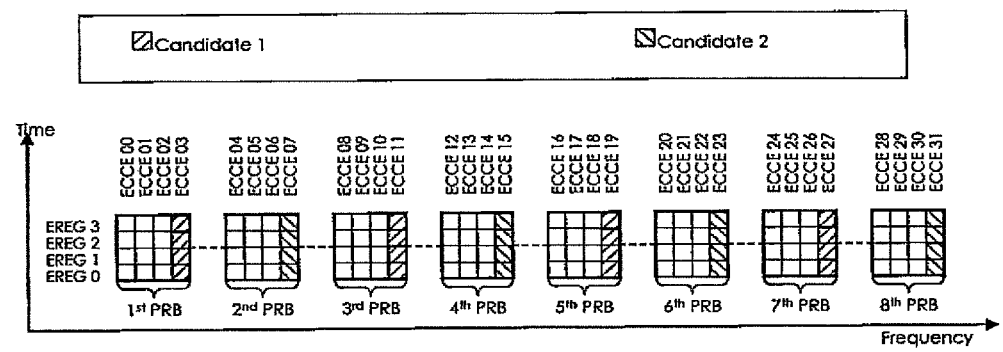
Figure 10:
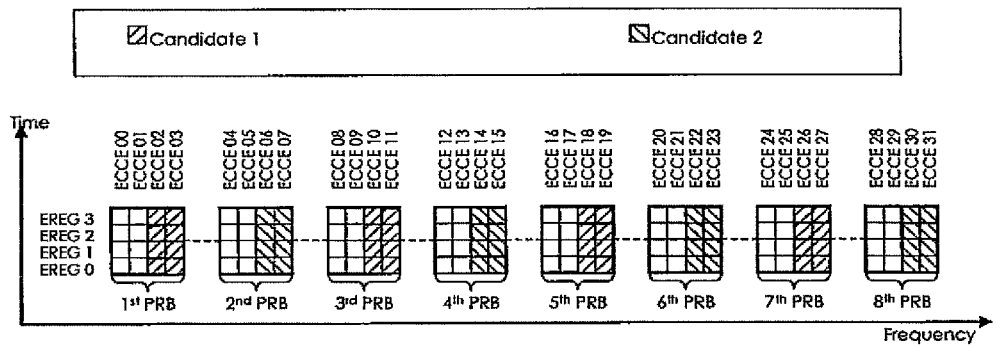
Figure 11:
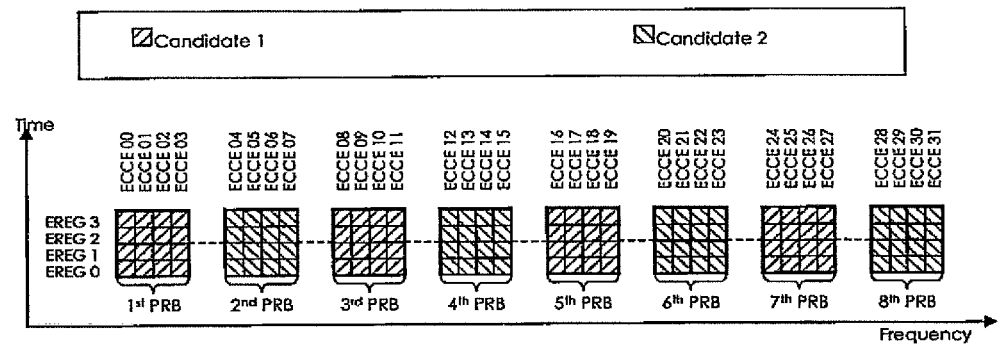

For NDIV=4, the possible candidates for each AL are shown in FIGS. 7, 8, 9, 10 & 11. Wherein FIG. 7 is for AL=1, FIG. 8 is for AL=2, FIG. 9 is for AL=4, FIG. 10 is for AL=8 and FIG. 11 is for AL=16.

It should be noted that, since there are 8 PRB pairs for this EPDCCH, and the GEREG=8, namely the EREG in every other two PRB pair constitute the same candidate, therefore there are two candidates 1 and 2. In this case, the UE or eNB determines all candidates 1 and 2 in the plurality of physical resource block pairs, based on the determined set.

As for the eNB, it selects one from the two determined candidates 1 and 2, and transmits the encoded physical downlink control channel in the selected candidate.

As for the UE, for a respective one of candidates 1 and 2, it decodes the signal transmitted on the set of units of resources for that candidate, for retrieving the physical downlink control channel from that candidate.

Example 2

Figure 12:
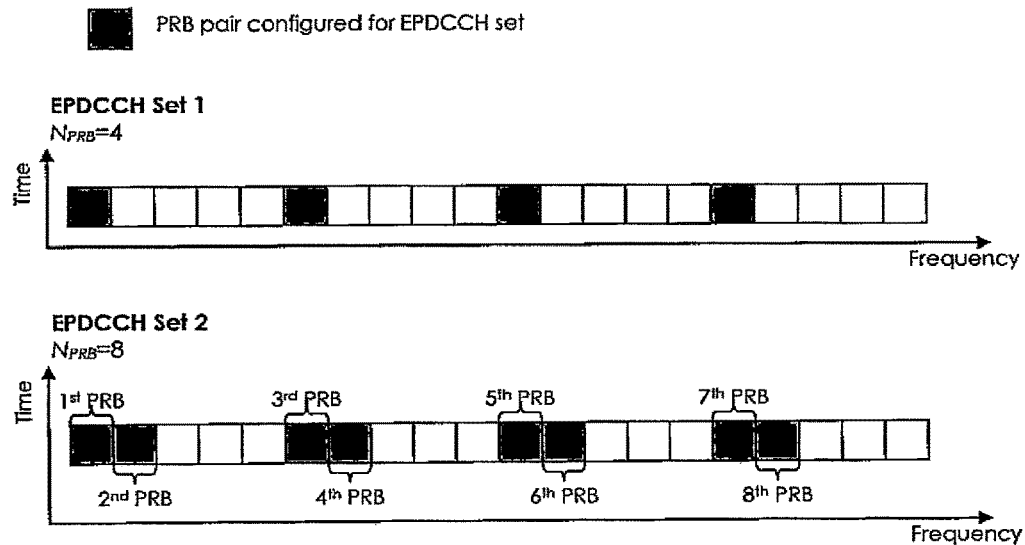
FIG. 12 shows two localized EPDCCH sets 1 and 2 in frequency time space.

Two localized EPDCCH sets are configured as shown in FIG. 12, where EPDCCH Set 1 consists of 4 PRB-pairs (NPRB=4) and for EPDCCH Set 2, NPRB=8. A minimum AL is imposed for EPDCCH set with adjacent PRB pairs where the minimum AL=8.

Assume the UE C-RNTI is 23 as in Example 1. We therefore have the following IECCE for each AL using Equation 1.

TABLE 2

| AL | $I_{ECCE}$ |
|----|------------|
| 1  | 3          |
| 2  | 2          |
| 4  | 0          |
| 8  | 0          |

Since this is a localized EPDCCH, there is no gap between two ECCE of an EPDCCH candidate within a PRB pair.

Since there is no adjacent PRB pairs in EPDCCH Set 1 in the time & frequency space, the ALs for EPDCCH Set 1 are 1, 2 and 4. For EPDCCH Set 2, we have adjacent PRB pairs and so the only AL for this EPDCCH set is 8.

Figure 13:
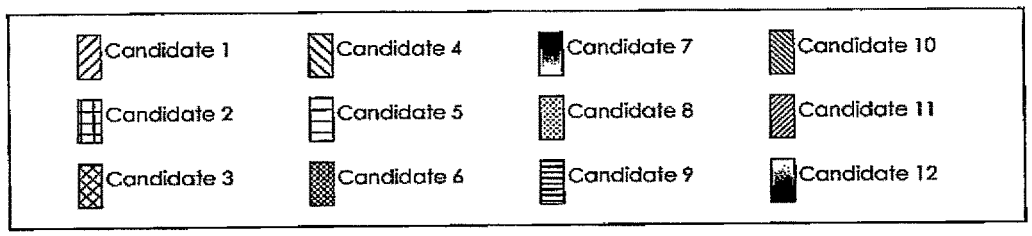
FIG. 13 shows EPDCCH candidates for localized EPDCCH Set 1 according to an embodiment of the invention.
Figure 13:
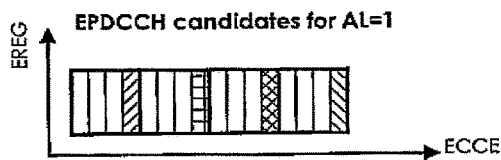
Figure 13:
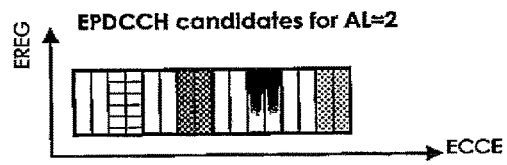
Figure 13:
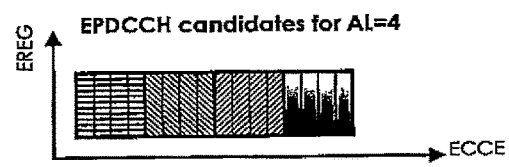

For EPDCCH Set 1, since there are 4 PRB pairs and the ECCE for PDCCH of one candidate locates within one PRB pair, four candidates with each in one PRB pair can be determined by the eNB and the UE: the candidates for EPDCCH Set 1 are shown in FIG. 13 where we have 4×AL1 candidates, 4×AL2 candidates and 4×AL4 candidates.

Figure 14:
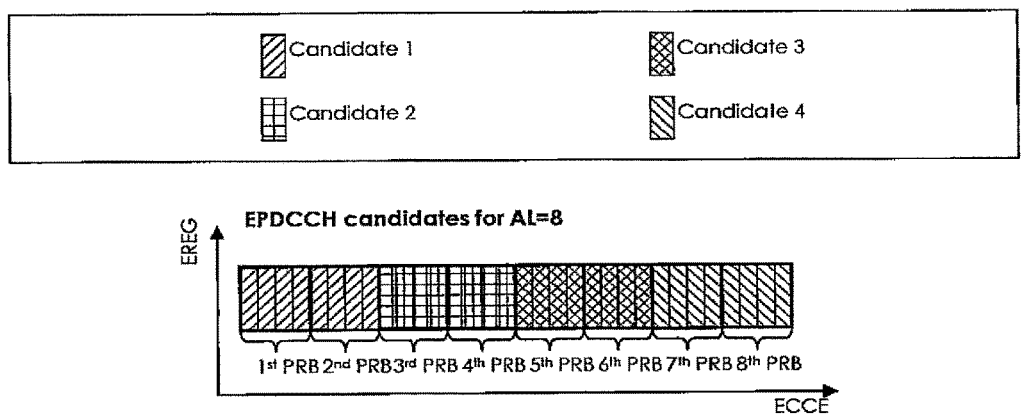
FIG. 14 shows EPDCCH candidates for localized EPDCCH Set 2 according to an embodiment of the invention.

The candidates for EPDCCH Set 2 are shown in FIG. 14 where we have 4×AL8 candidates.

Although the embodiments of the present invention have been explained hereinabove in detail, it should be noted that the above-described embodiments is for purpose of illustration only, and not to be construed as limitation of the invention. The present invention is not limited to these embodiments.

Those ordinary skilled in the art could understand and realize modifications to the disclosed embodiments, through studying the description, drawings and appended claims. All such modifications which do not depart from the spirit of the invention are intended to be included within the scope of the appended claims. The word "comprising" does not exclude the presence of elements or steps not listed in a claim or in the description. The word "a" or "an" preceding an element does not exclude the presence of a plurality of such elements. In the practice of present invention, several technical features in the claim can be embodied by one component. In the claims, any reference signs placed between parentheses shall not be construed as limiting the claim.

What is claimed is:

1. A method, in a UE or an eNB, of determining resources to be decoded by the UE to retrieve physical downlink control channels, comprising:
    determining a start position of a unit of resources in one physical resource block pair according to UE specific information;
    determining a gap between two of the units; and
    determining a set of units, in a given plurality of physical resource block pairs, according to said start position and said gap, as the resources to be decoded,
    wherein the gap between two of the units is not an integer-multiple of the size of one of the physical resource block pairs.

2. The method according to claim 1, wherein, said unit is a control channel element within a physical resource block, and said determining a start position of a unit of resources in one physical resource block pair according to UE specific information includes determining the start position of a control channel element in one physical resource block pair according to:
    the total number of control channel elements that is required in the physical downlink control channel; and
    the number of control channel elements in one physical resource block pair.

3. The method according to claim 2, wherein said determining a start position of a unit of resources in one physical resource block pair according to UE specific information includes using the following equation:

$$I_{ECCE} = \max[ID_{C\text{-}RNTI} \bmod(N_{ECCE}-(AL-1)), 0]$$

wherein, $I_{ECCE}$ stands for the index of the start control channel element in one physical resource block pair, $ID_{C\text{-}RNTI}$ stands for a UE-specific ID, $N_{ECCE}$ stands for the number of control channel elements in one physical resource block pair, and AL stands for the aggregation level that is relevant with the total number of control channel elements that is required in the physical downlink control channel.

4. The method according to claim 1, wherein the unit of the resources is a resource element group within a control channel element in a physical resource block pair, and said determining a start position of a unit of resources in one physical resource block pair according to UE specific information comprises:
    determining the start position of a control channel element, within which the resource element group is located, in one physical resource block pair according to:
        UE specific information;
        the total number of control channel elements that is required;
        the number of resource element groups in one control channel element; and
        the number of control channel elements in one physical resource block pair
    determining the start position of the resource element group in the control channel element according to:
        UE specific information;
        the total number of control channel elements that is required; and
        the number of resource element groups in one control channel element.

5. The method according to claim 4, wherein said determining the start position of a control channel element, within which the resource element group is located, in one physical resource block pair includes using the following equation:

$$I_{ECCE} = \max\left[ID_{C\text{-}RNTI} \bmod\left(N_{ECCE} - \left(\left\lfloor \frac{AL}{N_{EREG}} \right\rfloor - 1\right)\right), 0\right]$$

wherein, $I_{ECCE}$ stands for the index of the start control channel element in one physical resource block pair, $ID_{C\text{-}RNTI}$ stands for a UE-specific ID, $N_{ECCE}$ stands for the number of control channel elements in one physical resource block pair, $N_{EREG}$ stands for the number of resource element groups within one control channel elements, and AL stands for the aggregation level that is relevant with the total number of control channel elements that is required in the physical downlink control channel.

6. The method according to claim 4, wherein said determining the start position of the resource element group in the control channel element includes using the following equation:

$$I_{EREG} = \max[ID_{C\text{-}RNTI} \bmod(N_{EREG}-(AL-1)), 0]$$

wherein, $I_{EREG}$ stands for the index of the start resource element group within one control channel elements, $ID_{C\text{-}RNTI}$ stands for a UE-specific ID, $N_{EREG}$ stands for the number of resource element groups within one control channel elements, and AL stands for the aggregation level that is relevant with the total number of control channel elements that is required in the physical downlink control channel.

7. The method according to claim 1, wherein said determining a start position of a unit of resources in one physical resource block pair according to UE specific information includes determining the start position of a unit of the resources in one physical resource block pair further according to at least one of:
    the index of the sub-frame for the physical downlink control channel;
    the physical resource block pairs for the physical downlink control channel.

8. The method according to claim 1, wherein said unit is a control channel element within a physical resource block pair, and
    said determining a gap between two of the units comprises:
        determining the gap between two of the control channel elements; or
        determining the control channel elements within the same physical resource block pair as being contiguous.

9. The method according to claim 1, wherein the unit of the resources is a resource element group within a control channel element in a physical resource block pair, and said determining a gap between two of the units comprises:
  determining the resource element groups within the same control channel element as being contiguous;
  determining the gap between corresponding resource element groups within different physical resource block pairs according to:
  the number of control channel elements in one physical resource block pair;
  the total number of physical resource block pairs available for the physical downlink control channel; and
  the number of physical resource block pairs into which the physical downlink control channel is to be spread.

10. The method according to claim 9, wherein said determining a gap between two of the units includes using the following equation to determine the gap between corresponding resource element groups within different physical resource block pairs:

$$G_{EREG} = \left\lfloor \frac{(N_{ECCE} \times N_{PRB})}{N_{DIV}} \right\rfloor$$

wherein, $G_{EREG}$ is the gap in a unit of control channel element, $N_{ECCE}$ stands for the number of control channel elements in one physical resource block pair, $N_{PRB}$ stands for the total number of physical resource block pairs available for the physical downlink control channel, and $N_{DIV}$ stands for the number of physical resource block pairs into which the physical downlink control channel is to be spread.

11. The method according to claim 1, wherein the method is in a UE for retrieving the physical downlink control channel, the method further comprising:
  determining one or more candidates in said plurality of physical resource block pairs, based on the determined set;
  for a respective candidate, decoding the signal transmitted on the set of units of resources for that candidate, for retrieving the physical downlink control channel from that candidate.

12. The method according to claim 1, wherein the method is in an eNB for transmitting the physical downlink control channel, the method further comprising:
  determining one or more candidates in said plurality of physical resource block pairs, based on the determined set;
  selecting one from the one or more determined candidates, and transmitting the encoded physical downlink control channel in the selected candidate.

13. An apparatus, in a UE or an eNB, for determining resources to be decoded by the UE to retrieve physical downlink control channels, comprising:
  at least one processor; and
  at least one memory including computer program code;
  the at least one memory and the computer program code configured to, with the at least one processor, cause the apparatus at least to perform:
  determining a start position of a unit of resources in one physical resource block pair according to UE specific information;
  determining a gap between two of the units;
  determining a set of units, in a given plurality of physical resource block pairs, according to said start position and said gap, as the resources to be decoded;
  wherein the gap between two of the units is not an integer-multiple of the size of one of the physical resource block pairs.

* * * * *